Jan. 10, 1961 B. H. JONES 2,967,703
WEIGHING MACHINES
Filed Oct. 3, 1958
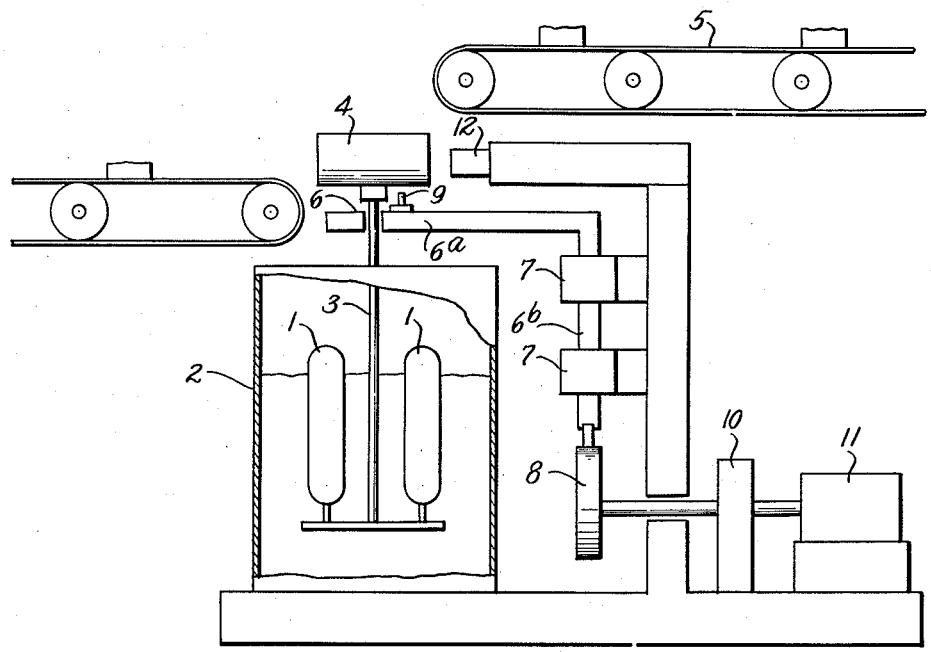
INVENTOR.
Brian Harold Jones
BY Bacon & Thomas
ATTORNEYS

United States Patent Office 2,967,703
Patented Jan. 10, 1961

2,967,703

WEIGHING MACHINES

Brian Harold Jones, Hillingdon, England, assignor to The Sperry Gyroscope Company Limited, Brentford, England, a British company Filed Oct. 3, 1958, Ser. No. 765,107

6 Claims. (Cl. 265—43)

This invention relates to weighing machines, for example machines for checking the weight of articles which are placed upon it in turn and for distinguishing between those articles which weigh more than a predetermined minimum weight and those which weigh less.

Where such articles are of a soft nature so as to be deformable, difficulty has arisen in placing them correctly on the carriage of a weighing machine to ensure that the whole weight is supported by the weighing unit, and one object of the invention is to render more simple the application of such articles to the carriage of a weighing machine, although it is to be understod that the invention is also useful for example, in weighing rigid articles of irregular form.

According to the present invention a weighing machine includes a weighing unit, a carriage arranged to support an article to be weighed by the unit, stop means arranged to prevent or restrict movement of the carriage in consequence of the impact of the arrival of an article on the carriage, and an initiation device arranged in response to the arrival of an article on the carriage, subsequently to render the stop means ineffective to allow the article to be weighed.

This arrangement has the advantage that articles can be dropped on to the carriage, for example, from a suitably arranged conveyor, and can thus be correctly positioned for weighing instead of possibly being supported only partly by the carriage, if for example they were pushed on to the carriage by a pusher or by the next succeeding article to be weighed as is the common practice with check weighing apparatus.

Preferably the stop means comprises a stop normally preventing the depression of the carriage from a normal position in which it is supported by the weighing unit, when no article is upon the said carriage, by more than a small amount in consequence of weight being placed upon the carriage. Then the stop may be arranged, on operation of the initiation device, to be lowered gently to apply the weight of the carriage and the article to the unit to carry out the weighing operation. A short interval of time after this, the stop may be automatically returned to its original position.

The invention may be carried into practice in different ways and one embodiment will now be described, by way of example only, as applied to a check weigher for weighing in turn a number of packets of potato crisps in order to determine whether their weight is above or below a predetermined weight, with reference to the accompanying drawing in which the only figure is a schematic diagram of a check weigher embodying the invention.

The weighing is carried out on a weighing unit of a know kind consisting of a body including a pair of floats 1 partly immersed in oil in a container 2 and carrying a vertical supporting shaft 3 which extends through the top of the container to a carriage 4 for supporting an article to be weighed. The body displaces a mass of the oil equal to its own mass together with that of the article upon it, so that the displacement from a "normal" position—that in which no article is supported—is dependent upon the weight applied.

Such a weighing unit is more fully described in British patent specification No. 633,075 and in United States Patent No. 2,522,767. When weighing is not in progress the carriage is supported mechanically above the normal position. In a usual practice of check weighing, articles, for example packets of biscuits, are in turn fed by a conveyor on to the carriage and each is weighed by allowing the weight of the carriage and article to be taken by the oil and noting the displacement. The articles are then removed from the carriage, for example by being pushed off by the next succeeding article, after the carriage has again been raised to its supported position. The articles may be arranged to be pushed into an "accept" or a "reject" channel according as the weight has been found to be above or below a certain minimum weight which can be determined by the amount of displacement of the carriage under the weight of the packet. A convenient way is to have a mercury switch which is closed if the carriage descends in excess of a certain amount, to energise a solenoid and close a gate across the "rejected" channel and open the "accepted" channel.

However, if the articles to be weighed are of a soft nature, or are of indefinite shape, for example a packet of potato crisps or other loose articles, or a lump of a commodity, or a quantity of granulated material, or liquid, it is not only more difficult to move the articles successively on to and off the carriage, but it is also difficult to ensure that they rest completely on the carriage and not partly on some other part of the machine so as to cause a false weight to be indicated.

In the preferred embodiment the articles are dropped in turn on to the carriage by being passed over the end of a conveyor belt 5. The carriage is formed of an open ended semicylindrical bucket 4 supported on the shaft 3 with its axis lying in a horizontal plane. As the articles are dropped on to the carriage it is important that the weighing operation does not take place until the article to be weighed has been brought to rest because otherwise the weight measured includes an error due to the acceleration of the article. It is also importnat that a weighing operation is only initiated after an article has in fact arrived on the carriage. Accordingly the carriage is arranged so that in its normal position it is supported by the oil about 1/16 of an inch above a stop 6.

The stop 6 is mounted near the free end of a horizontal arm 6a of an L-shaped member whose other arm 6b is supported in a vertical position by a pair of guide members 7. The lower end of the vertical arm 6b of the L-shaped member rests upon the control surface of a plate cam 8, so that on rotation of the plate cam about its axis the vertical position of the L-shaped member is changed to change the setting of the stop.

As soon as the weight of an article is received by the carriage, the carriage is depressed until brought to rest by the stop. On contact of the carriage and stop, a mercury switch 9 mounted on the stop is closed and so initiates the weighing cycle by setting in operation a single revolution clutch 10 operably connected between the cam 8 and an electric motor 11.

The weighing cycle is conventional and is carried out in the following manner.

Actuation of the single revolution clutch 10 causes the motor 11 to rotate the cam 8 to lower the stop so that the carriage and article are supported entirely by the oil, the displacement of the carriage then giving an indication of the weight of the article. By further rotation of the cam the stop is brought back to its original position—in which it supports the carriage—and then the cam is stopped.

The return of the stop to its original position is arranged to operate a tripping device (not shown) which actuates a solenoid operated pusher bar 12 which displaces the article from the carriage into the "accept" or "reject" channel according to whether the weight was found to be above or below the minimum weight. The pusher bar 12 is operated before the single revolution clutch 10 completes one full cycle of operation.

Once the article is removed the carriage is lifted above the stop by the oil.

The short distance through which the carriage moves before initiating the weighing cycle is not critical but depends upon the weight of the articles and the characteristics of the weighing unit. It is, of course, necessary that this distance should be less than the displacement corresponding to the predetermined or standard weight, and at the same time great enough to prevent the initiation of a weighing cycle before an article falls on to the carriage.

The machine is primarily used for weighing soft articles or articles capable of being distorted in shape, for example, bags of sweets, packets of soup powder, dough etc. and solves the problem of placing such articles correctly on to the weighing carriage and the problem of their subsequent removal. The machine may, of course, also be used to weigh solid articles of rigid shape.

I claim:

1. In a weighing machine, a weighing unit including a movable carriage arranged to support an article to be weighed by the unit, stop means arranged adjacent said carriage to engage the same and to arrest further movement of the carriage after an initial small movement thereof in response to the placing of an article on the carriage, and an initiation device responsive to said small movement of said carriage to render the stop means ineffective and to thereby allow the carriage to move to weigh the article thereon.

2. A weighing machine as claimed in claim 1 wherein the stop means comprises a stop normally spaced a small distance form said carriage to prevent depression of the carriage from a normal position in which it is supported by the weighing unit when no article is upon the said carriage, by more than a small amount in response to the weight of an article placed upon the carriage.

3. A weighing machine as claimed in claim 1 wherein the weighing unit includes a container for a body of liquid and float means adapted to be buoyantly supported by the liquid and to support the carriage and an article to be weighed resting therein.

4. A weighing machine as claimed in claim 1 wherein means are provided to sequentially drop the articles to be weighed into the carriage.

5. A weighing machine as claimed in claim 2 wherein means responsive to operation of the initiation device operates to lower the stop to release the weight of the carriage and the article to the weighing unit.

6. A weighing machine as claimed in claim 3 including means for automatically returning the stop to its original position a short interval of time after the weight of the carriage and the article has been released to the weighing unit.

References Cited in the file of this patent

UNITED STATES PATENTS

| | | |
|---|---|---|
| 2,099,893 | Jones | Nov. 23, 1937 |
| 2,260,691 | Popov | Oct. 28, 1941 |
| 2,522,767 | Tracy | Sept. 19, 1950 |
| 2,661,201 | Bowes | Dec. 1, 1953 |
| 2,838,176 | Pettis | June 10, 1958 |